(12) United States Patent
Bohus et al.

(10) Patent No.: US 9,836,700 B2
(45) Date of Patent: Dec. 5, 2017

(54) VALUE OF INFORMATION WITH STREAMING EVIDENCE BASED ON A PREDICTION OF A FUTURE BELIEF AT A FUTURE TIME

(71) Applicant: Microsoft Technology Licensing, LLC, Redmond, WA (US)

(72) Inventors: Dan Bohus, Kirkland, WA (US); Eric J. Horvitz, Kirkland, WA (US); Stephanie Rosenthal Pomerantz, Pittsburgh, PA (US); Semiha E. Kamar Eden, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 135 days.

(21) Appl. No.: 13/831,688

(22) Filed: Mar. 15, 2013

(65) Prior Publication Data

US 2014/0279719 A1    Sep. 18, 2014

(51) Int. Cl.
  *G06F 17/00*    (2006.01)
  *G06F 17/20*    (2006.01)
  *G06N 99/00*    (2010.01)

(52) U.S. Cl.
  CPC .................. *G06N 99/005* (2013.01)

(58) Field of Classification Search
  None
  See application file for complete search history.

(56) References Cited

U.S. PATENT DOCUMENTS

| | | | |
|---|---|---|---|
| 7,317,977 B2 | 1/2008 | Matrosov | |
| 7,363,515 B2 | 4/2008 | Frazier et al. | |
| 7,752,152 B2* | 7/2010 | Paek et al. | 706/20 |
| 7,957,271 B2* | 6/2011 | Creamer | H04L 47/10 370/229 |
| 2006/0260624 A1 | 11/2006 | Schur et al. | |
| 2008/0243439 A1 | 10/2008 | Runkle et al. | |
| 2008/0249874 A1* | 10/2008 | Seo | 705/14 |
| 2011/0029465 A1* | 2/2011 | Ito | G06K 9/00335 706/12 |
| 2011/0231016 A1 | 9/2011 | Goulding | |
| 2011/0313788 A1* | 12/2011 | Amland et al. | 705/3 |
| 2012/0023236 A1* | 1/2012 | Backholm | H04L 47/20 709/226 |

OTHER PUBLICATIONS

Hajishirzi et al. "Greedy Algorithms for Sequential Sensing Decisions", ijcai, 2009, pp. 8.*
Chalkidou et al. "Evidence-Based Decision Making: When Should We Wait for More Information?", Health Affairs, 2008, pp. 13.*

(Continued)

*Primary Examiner* — Li-Wu Chang

(57) ABSTRACT

The subject disclosure is directed towards processing evidence, which may include high-dimensional streaming evidence, into a future belief state. The existing evidence is used to project a belief about a future state. The future belief state may be used to determine whether to wait for additional evidence, or to act now without waiting for additional evidence, e.g., based on a cost of the delay. For example, an autonomous assistant may decide based upon the belief whether to engage a person or not, or to wait for more information before the engagement decision is made.

20 Claims, 9 Drawing Sheets

(56) References Cited

OTHER PUBLICATIONS

Garnick "How to handle a relapse after treatment for prostate cancer", Nov. 2011, pp. 12 https://web.archive.org/web/20111110124804/http://www.harvardprostateknowledge.org/how-to-handle-a-relapse-after-treatment-for-prostate-cancer.*

Reyes, et al., "Solving Hybrid Markov Decision Processes", In Proceeding of 5th Mexican International Conference on Artificial Intelligence, Nov. 13, 2006, 11 pages.

Ji, et al., "Non-Myopic Multi-Aspect Sensing with Partially Observable Markov Decision Processes", In IEEE Transaction Signal Processing, vol. 55, Issue 6, Jan. 2007, 9 pages.

Armstrong-Crews, et al., "Oracular Partially Observable Markov Decision Processes: A Very Special Case", In IEEE International Conference on Robotics and Automation, Apr. 2007, 6 pages.

Armstrong-Crews, et al., "An Approximate Solution for Oracular Pomdps", In IEEE International Conference on Robotics and Automation, May 19, 2008, 7 pages.

Ben-Bassat, Moshe, "Myopic Policies in Sequential Classification", In Journal of IEEE Transactions on Computers, vol. C-27, Issue 2, Feb. 1978, 5 pages.

Boutilier, et al., "Decision Theoretic Planning: Structural Assumptions and Computational Leverage", In Journal of Artificial Research, vol. 11, Jul. 1999, 94 pages.

Dagum, et al., "Approximating Probabilistic Inference in Bayesian Networks is NP-Hard", In Journal of Artificial Intelligence, vol. 60, Issue 1, Mar. 1993, 13 pages.

Heckerman, et al., "An Approximate Nonmyopic Computation for Value of Information", In Journal of IEEE Transactions on Pattern Analysis and Machine Intelligence, vol. 15, Issue 3, Mar. 1993, 7 pages.

Horvitz, et al., "Busybody: Creating and Fielding Personalized Models of the Cost of Interruption", In Proceedings of the ACM Conference on Computer Supported Cooperative Work, Nov. 6, 2004, 5 pages.

Horvitz, et al., "Coordinate: Probabilistic Forecasting of Presence and Availability", In Proceedings of the Eighteenth Conference on Uncertainty and Artificial Intelligence, Aug. 1, 2002, 10 pages.

Horvitz, Eric J. "Reasoning about Beliefs and Actions under Computational Resource Constraints", In Proceedings of the Workshop on Uncertainty in Artificial Intelligence, Jul. 10, 1987, 23 pages.

Horvitz, Eric, "Principles and Applications of Continual Computation", In Journal of Artificial Intelligence—Special Issue on Computational Tradeoffs Under Bounded Resources, vol. 126, Issue 1-2, Feb. 2001, 38 pages.

Powell, Warren B. "Merging AI and OR to Solve High-Dimensional Stochastic Optimization Problems using Approximate Dynamic Programming", Retrieved on: Oct. 3, 2012, 16 pages. Available at: http://adp.princeton.edu/Papers/Powell-MergingAIandOR.pdf.

Selman, et al., "Challenge Problems for Artificial Intelligence", In Proceedings of the Thirteenth National Conference on Artificial Intelligence, vol. 2, Aug. 1996, 6 pages.

Sidner, et al., "Explorations in Engagement for Humans and Robots", In Journal of Artificial Intelligence, vol. 166, Issue 1-2, Jul. 21, 2005, 31 pages.

Bonus, et al., "Models for Multiparty Engagement in Open-World Dialog", In Proceedings of Sigdial Conference: The 10th Annual Meeting of the Special Interest Group in Discourse and Dialogue, Sep. 2009, 10 pages.

Rosenthal, et al., "Value of Information with Streaming Evidence", Microsoft Research Technical Report, MSR-TR-2012-99, 2012, 11 pages.

Kaelbling, et al., "Planning and Acting in Partially Observalbe Stochastic Domains", Dec. 17, 1997; 42 pages.

Kamar, et al., "Combining Human and Machine Intelligence in Large-scale Crowdsourcing", AAMAS 2012, Conitzer, Winikoff, Padgham, and van der Hoek, Jun. 4-8, 2012, Valencia, Spain, 8 pages.

Oliver, et al., "Selective Perception Policies for Guiding Sensing and Computation in Multimodal Systems: A Comparative Analysis", ICMI '03, Nov. 5-7, 2003, Vancouver, British Columbia, Canada, 8 pages.

Cooper, G. 1990. The computational complexity of Bayesian inference using bayesian belief networks. Artificial Intelligence 42(2):393-405.

Gilks, W.; Richardson, S.; and Spiegelhalter, D. 1996. Markov Chain Monte Carlo in Practice. Chapman & Hall CRC, 9 pages.

* cited by examiner

VALUE OF INFORMATION WITH STREAMING EVIDENCE BASED ON A PREDICTION OF A FUTURE BELIEF AT A FUTURE TIME

BACKGROUND

The decision processes of acting under uncertainty and reasoning about the possibilities of future states is a widely cited challenge that has been researched for many years. When applied to autonomous systems, a prominent class of problems that can be addressed with this decision process can be summed up as whether to act now based on current evidence or to wait for more evidence that may potentially improve the action selection, at the cost of delay.

By way of a practical example, physically situated systems such as robots or embodied conversational agents typically rely on continual sensing to make inferences about the state of their sensed world and to guide their decisions. To identify ideal actions over time, these systems need to evaluate whether to act immediately using current sensory data or wait for more data that may possibly improve state estimates before acting. Consider a conversational agent embodied as a program that operates a display monitor, speakers, microphone and camera mounted outside a person's office. The agent may use a combination of face detection and tracking components to track the trajectory of people in its vicinity based on an analysis of pixels in the video stream. In addition, a face recognition component may be used to identify actors in the scene. At a higher level, the spatial trajectory and identity percepts can be fused to make inferences about the person's goals, and ultimately drive interaction decisions, such as when to initiate or break conversational engagement with people nearby.

The traditional approach to deliberating about the value of collecting additional information in advance of action is to compute the expected value of information (VOI), which is a measure of the difference of the expected value of the best decision before and after information is collected, considering the cost of acquiring the information. This includes the loss in value associated with the delay of action to await for the new information. However, with an autonomous system such as a conversational agent, the nature of the sensory evidence is streaming and high-dimensional (e.g., thousands of pixels regularly received in captured frames). There are challenges with computing VOI in settings with streaming, high-dimensional sensory evidence that make the traditional approaches unsuitable.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards constructing one or more belief projection models from existing evidence, including streaming evidence, to predict a future belief over a state at a future time. The prediction of the future belief is used to determine whether to act or wait for additional evidence.

In one aspect, processing logic is coupled to a sensor set comprising one or more sensors, and is coupled to an output mechanism set comprising one or more output mechanisms. The processing logic is configured to process evidence received via the sensor set, including streaming evidence, into one or more belief projection models, and to construct one or more probability distributions based upon the belief projection models to predict possible future beliefs over a state at a future time using the received evidence. The processing logic uses the predicted future beliefs to determine whether to act via the output mechanism set or wait for additional evidence to be received.

In one aspect there is described receiving sensory evidence, including high-dimensional streaming evidence, and processing the sensory evidence to project future beliefs over states. The predicted future belief is used to make a decision, e.g., to wait for additional evidence to be received, or to select which action to take, without waiting for additional evidence.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards using discriminatively trained conditional models to predict future belief states from existing evidence, along with using these models to weigh the tradeoffs between acting immediately, waiting for more sensory evidence to accumulate, and/or orchestrating which sensors are to be activated at a given time. The models may be learned automatically from data via self-supervision, and may be included into hierarchical inferential architectures.

In general, instead of using a generative model that predicts the probability of future evidence, the model described herein predicts what the belief over the state at a future time will be, based upon the existing evidence. In other words, using the current evidence, the prediction is based upon a projected (computed) belief of what the future belief likely will be. Predictions about future beliefs may be used to compute the expected cost of taking an optimal action at that time.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and computerized decision making in general.

Figure 1:
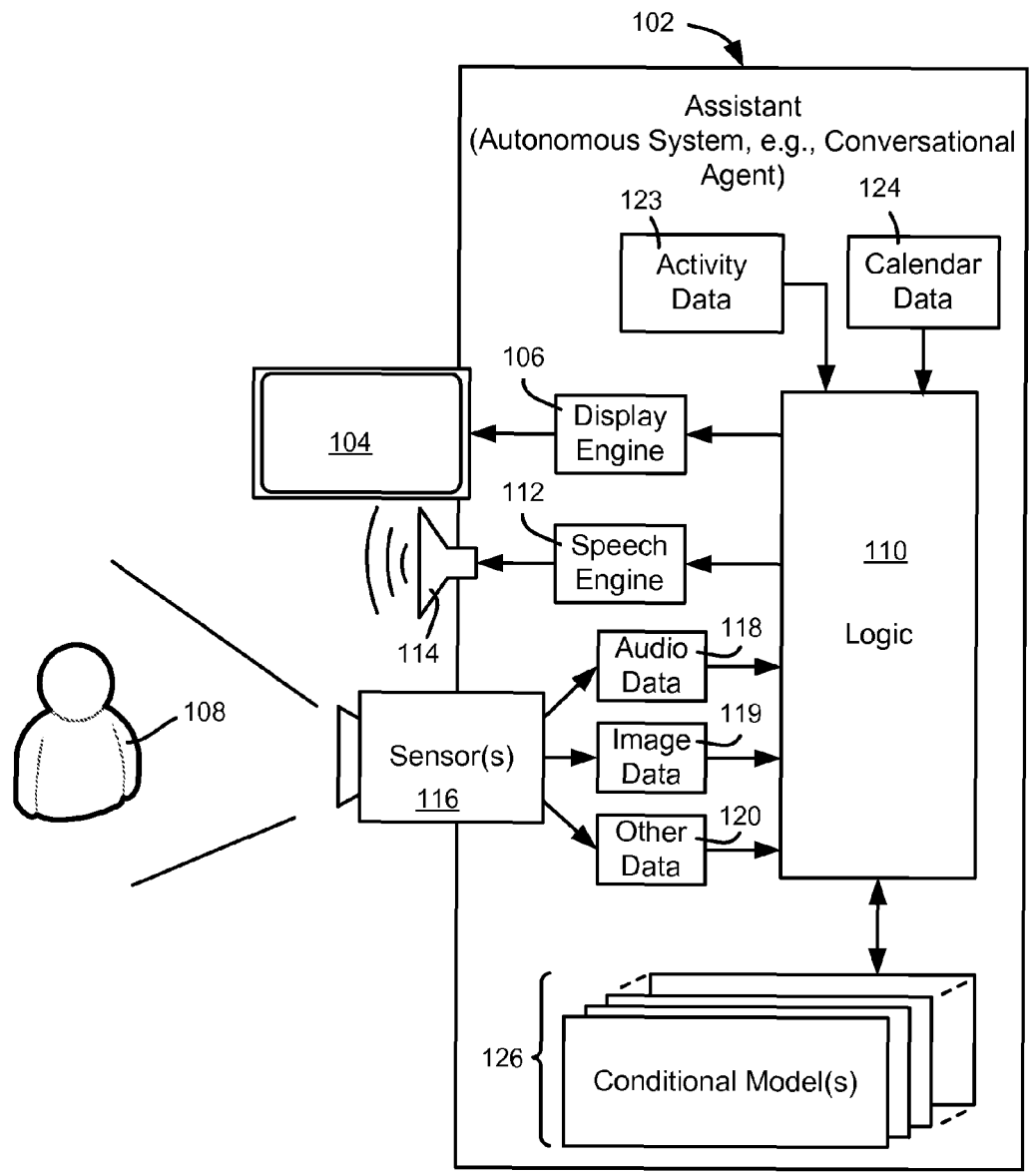
FIG. 1 is a block diagram including components configured to act as an autonomous assistant via processing logic that processes sensory evidence to predict future belief states, according to one example embodiment.

FIG. 1 is a representation of an example implementation of an autonomous system that serves as an automated secretary or the like, referred to and exemplified as an assistant 102. For example, one implementation provides the assistant 102 as a multimodal interactive kiosk that displays an avatar head on a display 104 and is stationed outside an office. A display engine 106 controls the output to the display 104, e.g., in the form of graphics, text, animations and/or video to (possibly) interact with a user 108 based upon various decisions made by a controller 110. The controller 110 also causes the output of natural language to interact with people, possibly the user 108, as represented by the speech engine 112 and speaker 114. In this way, the assistant 102 can interact via spoken language with visitors who stop by its owner's office and can handle a variety of administrative tasks such as providing information about the whereabouts and future availability of its owner, scheduling meetings, and relaying messages.

The exemplified assistant 102 uses multiple sensors 116, such as a wide-angle camera, microphone array (e.g., based upon Kinect™ technology), and RFID badge reader, to make real-time inferences about people in its proximity, including their identities, activities and goals. This is represented by the image data 118 (e.g., frames of captured video), audio data 119 and other data 120.

The assistant 102 may be a domain expert in the presence and availability of its owner. For example, the assistant 102 may have access to the computer activity of its owner, Wi-Fi fingerprints of devices on the network being used by the owner, and calendar data, as represented via activity data 123 and calendar data 124. The underlying system may continuously (or frequently/occasionally/on demand) makes probabilistic forecasts about arrival times and likely availabilities of the owner.

By constructing one or more conditional models (collectively labeled 126 in FIG. 1), each based upon some of the sensory evidence, which includes data that is streaming and high dimensional in nature, the assistant 102 is able to make decisions with respect to acting under uncertainty. To this end, described herein is computing VOI based upon high-dimensional streaming evidence, including to make decisions about acting now versus later, and about sensors (e.g., whether to invoke further sensors, different sensors and so forth). The decision may be directed towards a mixed-initiative engagement challenge with the assistant 102, e.g., whether to engage a person in a conversation, or wait for more information.

In general, engagement is a process by which participants in a conversation coordinate their actions to initiate, maintain and terminate their interactions. For autonomous systems, a conservative engagement policy is to wait for users to initiate engagement with the system by entering in a user-initiated "f-formation" with the system, in which the user approached and stood closely in front of a camera sensor. This policy was designed to minimize false positives, i.e., cases where the system would initiate engagement with someone who was just walking by or who was standing nearby but talking to someone in another office, and also was straightforward to detect.

However, this prior engagement policy did not account for those people who do not initiate engagement, including people who are waiting for the owner to return to his or her office or to become available (that is, when the owner is already in the office, but busy). Indeed, in actual situations, instead of seeking engagement, many times a person tends to bypass the autonomous system and sit in a nearby chair, or talk to others while waiting. In these situations, the conservative user-initiated engagement policy missed important opportunities to engage a waiting person in dialog on behalf of the owner. The cost of these missed opportunities can be high. As one example, the system may know that the owner is running late for a scheduled meeting, but because the visitor does not initiate engagement, the system using the conservative engagement policy does not let the visitor know before he or she leaves in frustration.

As described below, rather than relying exclusively on user-initiated engagement, a system described herein (implemented as the assistant 102) is configured to proactively initiate engagement with someone in the scene, even at a distance, if the system knows (e.g., to a threshold confidence) that the person is looking for the owner and that the system can provide helpful information. The mixed-initiative engagement policy hinges on inferences about the engagement action and the goal of the person. As described herein, the proactive engagement policy balances the costs of engaging people that are not looking for the owner, with the costs of missed opportunities to engage visitors before they leave.

In one aspect, the quality of sensory evidence collected and the inferences made from this evidence often may be improved at the cost of additional time delay for sensing and computation. In general, accumulating additional sensory evidence over time can lead to more accurate inferences (e.g., for face identification, intention recognition, and so forth). Also, more powerful sensors can be turned on, and/or more sophisticated algorithms for audiovisual scene analysis may be run, e.g., at sub-real-time speeds. In addition, systems may be able to solicit and obtain external assistance in quasi-real time. For instance, recognizing faces far from the camera may be difficult, but a system may be able to query people drawn from a knowledgeable crowd for assistance with identifying the person. In this case, the crowd acts in effect as a time-delayed sensor; however the additional evidence may arrive with various delays. When sensors and inferences are characterized by different levels of accuracy and by stochastic time-delays, tradeoffs arise between acting immediately and waiting for more information to accumulate prior to acting.

Thus, time plays a role in the evidence collecting and decision making processes, including that some perceptual inferences may become more accurate over time, as the system gathers additional sensory evidence. In the above example, face identification can become more accurate over time and as the person moves closer to the camera. In addition, the assistant has the ability to seek external assistance in real time, e.g., the system can take and send a snapshot of the scene to human volunteers and/or employees (such as receptionists) in real-time and ask them to help identify the person in the scene, with responses to such information-gathering actions arriving with a stochastic delay. Note that the crowd need not be completely knowledgeable with respect to a person's identity, e.g., a crowd may be asked a series of questions, such as whether the person appears to be a male or female, whether the person appears to be above a certain height, an approximate age of the person and so on to help the system narrow in on the correct identity of the person/user.

Furthermore, the unknown person might leave after a while, before the system has had a chance to reliably identify him or her. The methods described herein enable the assistant 102 to reason about the current evidence and the value of additional sensory evidence that will likely be accumulated in the near future, and to resolve tradeoffs between different courses of action, in this case engaging, not engaging, or waiting for additional evidence to be accumulated (possibly including seeking expert assistance).

Thus, one aspect is directed towards the tradeoff between acting immediately based on existing evidence versus collecting additional evidence prior to acting. In a decision theoretic setting, this tradeoff may be resolved by computing the value of information (VOI). Let $p(s|E)$ be a model that infers the world state s based on existing evidence E, and $C(s, a)$ be a cost function defined on world states and the actions $a \in A$ that the system may take. The value of information computation determines the difference between the expected value of taking an information gathering action $a_{info}$ which reveals additional evidence e and selecting the best domain action a and terminating the decision process.

$$V_{info}(E) = \sum_s p(s|E) \cdot C(s, a_{info}) + \sum_e p(e|E) \cdot \max_a \sum_{s'} p(s'|E \cup e) \cdot C(s', a) \quad (1)$$

and the expected value of acting immediately, based on the existing evidence E:

$$V_{act}(E) = \max_a \sum_s p(s|E) \cdot C(s, a)$$

This approach can be extended in a straightforward manner to reason about sequences of information gathering actions. However, VOI can be intractable to compute for problems with large state spaces or high-dimensional sensory evidence (as in FIG. 1 where the audio data 118 and/or image (video) data 119 arrive as high-dimensional streaming evidence) due to difficulties in constructing generative evidence models $p(e|E)$ and due to the summations over all possible values (high branching factor).

Notwithstanding, using technology described herein, the value of information (VOI) approach for guiding the decision of whether to wait versus act is applicable in settings with high-dimensional, streaming sensory evidence. The waiting action can be viewed as an information gathering action, that is, additional sensory evidence e is collected while the system is waiting. Let $\psi_t$ denote the sensory evidence observed by the system up to the current time-point t, i.e., $E=\psi_t$. The new evidence e that will be revealed by waiting until some future time t+k is $E=\psi_{t+k}$, where in one implementation $\psi_{t+k}$ comprises a sequence of high-dimensional sensory evidence vectors that are collected from time 1 to time t+k, $\psi_{t+k}=\{\psi_i\}_{i=1:t+k}$. If for generality it is assumed that state s changes over time, and $s_{t+k}$ denotes the state at time t+k, the expected value of waiting, computed based upon equation (1) becomes:

$$V_{info}(\psi_t) = \sum_{s_t} p(s_t|\psi_t) \cdot C(s_t, a_{info,k}) + \left( \sum_{\psi_{t+k}} p(\psi_{t+k}|\psi_t) \cdot \max_a \sum_{s_{t+k}} p(s_{t+k}|\psi_{t+k}) \cdot C(s_{t+k}, a) \right)$$

A direct computation of the expected value of information (or waiting), requires a model for $p(\psi_{t+k}|\psi_t)$, that is, $p(\psi_1, \psi_2, \ldots, \psi_{t+k}|\psi_t)$. Building this type of generative model for future sensory evidence is in most cases intractable due to the streaming and high-dimensional nature of the sensory evidence $\psi_i$. Alternative formulations often used in Bayes Nets that rely on a factorization of $p(\psi_{t+k}|\psi_t)$ based on $p(\psi_{t+k}|s_t) \cdot p(s_t|\psi_t)$ encounter similar tractability challenges.

A model for generating $p(\psi_{t+k}|\psi_t)$ is described herein to estimate the future state $s_{t+k}$, with the sensory evidence $\psi_{t+k}$ needed to estimate $s_{t+k}$, via $p(s_{t+k}|\psi_{t+k})$. Because learning a generative model for future sensory evidence $p(\psi_{t+k}|\psi_t)$ is intractable, described herein is a reformulation of the expected value of information computation that (unlike the traditional approach) relies on a direct prediction of what the results of the sensory inference $b_{t+k}(s_{t+k})=p(s_{t+k}|\psi_{t+k})$ will be at future times t+k, conditioned on the current evidence at time t:

$$p(b_{t+k}|\psi_t) = p(p(s_{t+k}|\psi_{t+k})|\psi_t)$$

Note that $p(b_{t+k}|\psi_t)$ is referred to herein as a belief projection model. This model may be used in the expected value of waiting computation as follows:

$$V_{wait}(\psi_t) = \sum_{s_t} p(s_t|\psi_t) \cdot C(s_t, a_{wait}) + \left( \sum_{b_{t+k}(s_{t+k})=p(s_{t+k}|\psi_{t+k})} p(b_{t+k}|\psi_{t+k}) \cdot \max_a \sum_{s_{t+k}} b_{t+k}(s_{t+k}) \cdot C(s_{t+k}, a) \right)$$

Thus, instead of using a generative model $p(\psi_{t+k}|\psi_t)$ that predicts the probability of future evidence, a model is used that directly predicts what the belief over the state $s_{t+k}$ at time t+k will be, $b_{t+k}(s_{t+k})=p(s_{t+k}|\psi_{t+k})$ conditioned on the existing evidence $\psi_t$. This predicted future belief may be used to compute the expected cost of taking the optimal action at that time, e.g., $\max_a \Sigma_{s_{t+k}} b_{t+k}(s_{t+k}) \cdot C(s_{t+k}, a)$.

Figure 2:
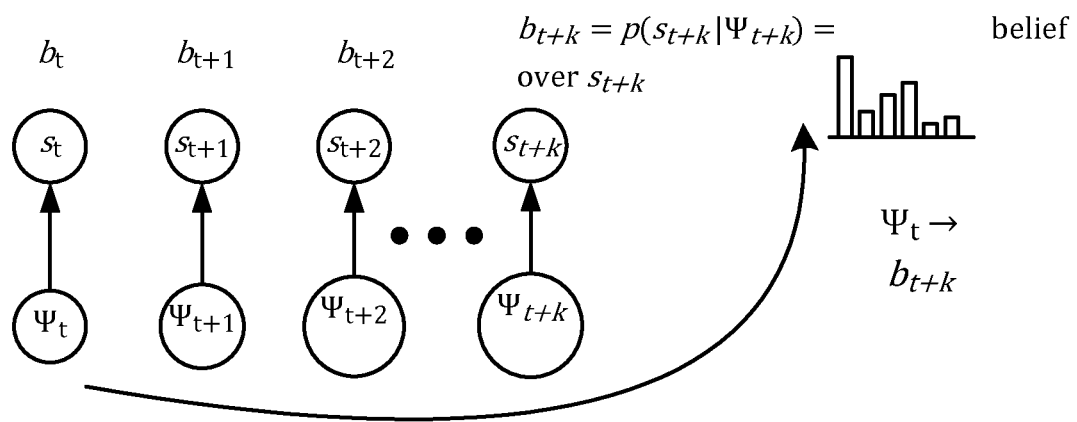
FIG. 2 is a representation of processing training data for a belief projection model, according to one example embodiment.

The belief projection model $p(b_{t+k}|\psi_t)$ can be trained in a supervised fashion based on a corpus of labeled data. For each training data point $(\psi_t, b_{t+k})$ the features $\psi_t$ describe the sensory evidence collected up to time t. The corresponding label $b_{t+k}$ comprises the output of the state inference models at some future time t+k, i.e., $p(s_{t+k}|\psi_{t+k})$; the training label is a belief over the state $s_{t+k}$. Training data can be collected by running a system with a given inference model $p(s_i|\psi_i)$; and recording the input features and the belief $b_i$ over $s_i$ produced by this model at each time point 1. FIG. 2 exemplifies training data for a belief projection model, with pairs of the form $\psi_t \rightarrow b_{t+k}$, which can be collected automatically at runtime by recording the outputs $b_{t+k}$ of the state inference model at each time point t+k.

A belief projection model may be learned automatically from data via parametric machine learning approaches, e.g., like fitted mixtures of Beta or Dirichlet distributions. A belief projection model may be learned automatically from data via non-parametric machine learning approaches, e.g., like decision trees. A belief projection model may be manually constructed via a set of heuristic rules, e.g., by a domain expert.

The belief projection model computes a belief over the belief of the state $s_{t+k}$, given the current evidence. The training labels therefore comprise $b_{t+k}$ beliefs over the state $s_{t+k}$. For instance, if the state is binary, i.e., $s_{t+k} \in \{0,1\}$, the belief over $s_{t+k}$ is defined over the unit simplex, i.e., $b_{t+k} \in \Delta^1$, which is the [0, 1] real interval. In this case the belief projection model constructs a probability distribution over this simplex, or over the [0, 1] interval. An approach to the belief projection model is to employ a mixture of Beta distributions and learn the model parameters in a maximum likelihood manner. An alternative is to discretize the [0, 1] interval into several bins, treat the problem as multinomial classification, and build a model via discriminative learning techniques such as maximum entropy models or decision trees. The complexity of the learning problem increases as the size of the original state space increases. For instance, if instead of binary, the state is a multinomial variable with m possible values, i.e., $s_{t+k} \in \{0, 1, \ldots m-1\}$, the belief of $s_{t+k}$ is defined over the unit m−1 simplex, i.e., $b_{t+k} \in \Delta^{m-1}$. The belief projection model may be constructed in this case as a mixture of Dirichlet distributions, and model parameters may be learned in a maximum likelihood manner. Approaches based on discretizing $\Delta^{m-1}$ into bins, e.g., based on memory-based learning and sampling, also may be employed Note that the described approach sums over all possible beliefs $b_{t+k}(s_{t+k})$. In practice, a tractable solution for computing this sum (integral) may be used. One approach that works well when the underlying state space is small is to discretize the belief space (the simplex) into a number of bins, and sum over the corresponding probabilities. Another alternative is to construct belief projection models with parametric forms that allow for analytic integration. Sampling methods may be used to sample the beliefs and approximate the integral according to the belief projection model $p(b_{t+k}|\psi_t)$.

In practice, many physically situated systems are comprised via a coupling of multiple, modular inference components into more complex architectures. A hierarchical structure is often harnessed for state inference. For instance, lower level inference components such as speech recognition, face tracking, and face identification may abstract the high-dimensional streaming sensory evidence such as raw audio and video data into fewer lower-dimensional percepts, such as words spoken, the location and identity of a person, and so forth. The outputs of these perceptual models are then used as inputs for making higher-level inferences about goals, activities, and other relevant state variables, which ultimately drive interaction decisions. In engineering such integrative systems, the lower-level, perceptual models may be off-the-shelf components that are trained and optimized individually, prior to integration in a given application. These models tend to be more domain independent than the higher-level state inference models, which are often trained for a specific domain.

Figure 3:
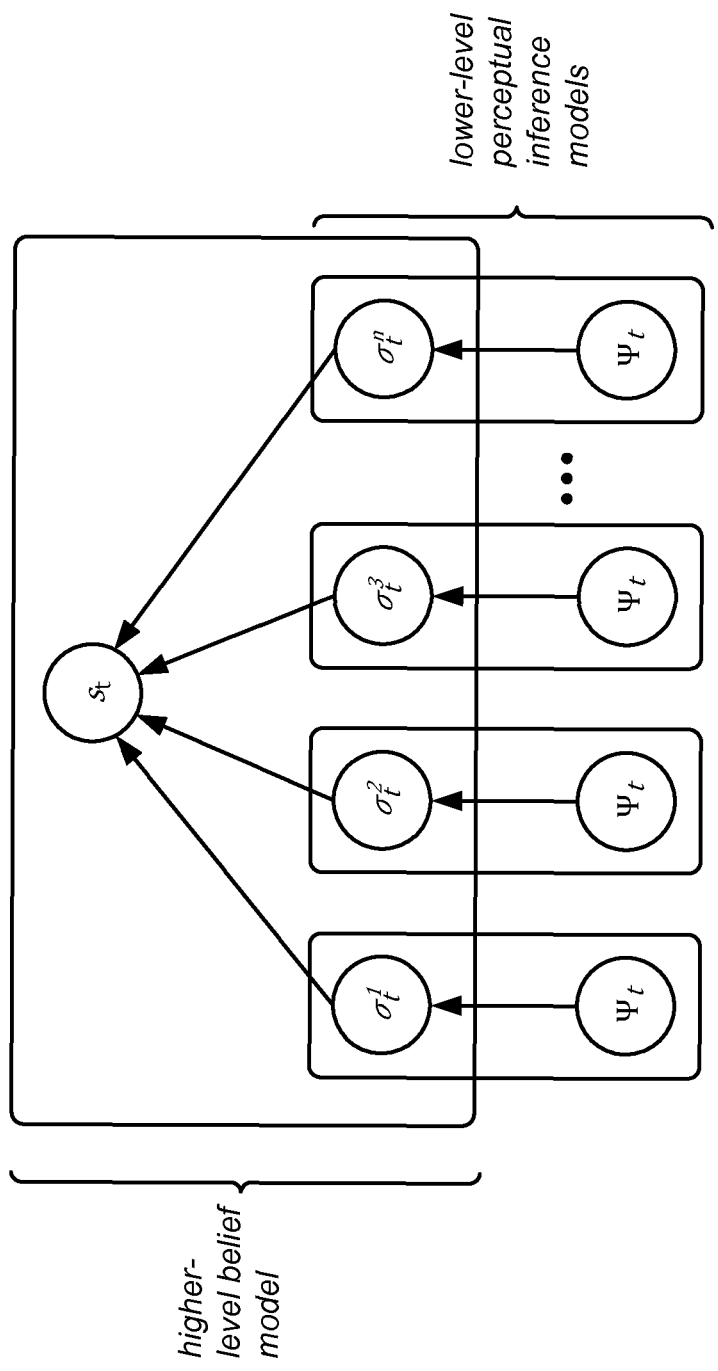
FIG. 3 is a representation of using lower-level perceptual inference models to obtain a higher-level state inference model, according to one example embodiment.

One approach described herein for computing VOI can be extended to such modular inference architectures. Let R denote a set of lower-level perceptual inference models and $\vec{\sigma_t} = \langle \sigma_t^r \rangle$ denote the n-tuple of percepts from each inference model r∈R (FIG. 3). At time t, each perceptual inference model computes $p(\sigma_t^r|\psi_t)$ independently from other perceptual inference models. Each of these models may use as evidence different subsets of $\psi_t$, but in general multiple models may use the same evidence, e.g., the video stream may be used by a face tracker, a head-pose tracker and a face identification perceptual model. The state inference $p(s_t|\psi_t)$ is decomposed based on the hierarchical structure using the perceptual inference models into:

$$p(s_t | \psi_t) = \sum_{\vec{\sigma_t}} p(\vec{\sigma_t} | \psi_t) \cdot p(s_t | \vec{\sigma_t})$$

where $p(\vec{\sigma_t}|\psi_t) = \Pi_r p(\sigma_t^r|\psi_t)$. The higher level state inference model conditioned on percepts $p(s_t|\vec{\sigma_t})$ is assumed known. In this hierarchical structure, the expected value of waiting may be computed as follows:

$$V_{wait}(\psi_t) = \left[ \sum_{s_t} \sum_{\vec{\sigma}_{t+k}} \left( \prod_n p(\sigma_{t+k}^n | \psi_{t+k}) \right) \cdot C(s_t, a_{wait}) \right] +$$

$$\sum_{b_{t+k}^1, \ldots, b_{t+k}^r} \left[ \left( \prod_{n=1}^r p(b_{t+k}^n | \psi_t) \right) \cdot \right.$$

$$\left. \max_{a \in A} \sum_{s_{t+k}} \sum_{\vec{\sigma}_{t+k}} \left( \prod_n b_{t+k}^n(\sigma_{t+k}^n) \right) \cdot p(s_{t+k} | \vec{\sigma}_{t+k}) \cdot C(s_{t+k}, a) \right]$$

where the perceptual inference models are $b_{t+k}(\vec{\sigma}_{t+k}) = p(\vec{\sigma}_{t+k}|\psi_{t+k})$. Note that this formulation predicts future beliefs over the lower-level percepts $\vec{\sigma}_{t+k}$, i.e., perceptual inference projection models are constructed conditioned on the current evidence $p(p(\sigma_{t+k}^n|\psi_{t+k})|\psi_t)$. These perceptual inference projection models can be trained independently from each other by recording the outputs of the perceptual inference models $p(\sigma_{t+k}^n|\psi_{t+k})$ over time under the assumption that the action $a_{wait}$ has no effect on the environment and evidence.

Returning to the example of FIG. 1, the state S relevant for making engagement decisions includes two variables. One variable is the user's Engagement Action (EA), which includes two values, namely "engaging," denoting that the user is initiating/entering into an engagement (e.g., an f-formation) with the Assistant, or "not-engaging" denoting that the user is acting otherwise. Another variable is the user's Goal (G), which includes two values, namely "looking-for-owner," denoting that the user is looking for the owner, or "other" if this is not the case.

Figure 4:
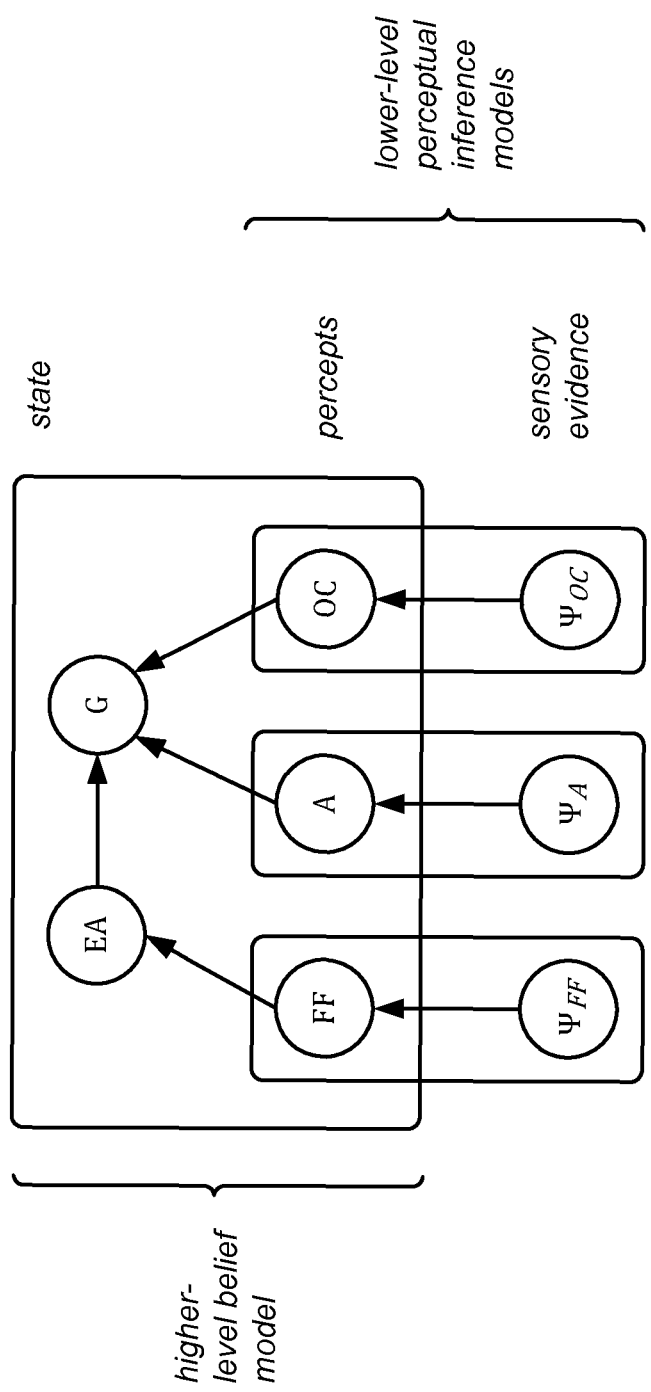
FIG. 4 is a representation of processing sensory evidence into percepts, and the percepts into belief state data, according to one example embodiment.

State inference may be based on a hierarchical graphical model such as represented in FIG. 4, which leverages three lower-level percepts inferred via direct, conditional models:

F-Formation (FF): indicates whether or not a user is entering in an f-formation with the assistant 102. The inference may be based on a conditional model (manually constructed or trained from data) that leverages lower level features such as sustained attention, the trajectory of the face, including speed of movement, proximity, centrality of location.

Activity (A): indicates whether or not the user is approaching the assistant 102. The inference may be based on a conditional model (manually constructed or trained from data) that leverages information about the proximity of the face. Note that Activity correlates with, but is different from f-formation; for example, an actor may be approaching but not entering in an f-formation with the assistant 102, such as when the owner enters his or her office, and in the process passes by in close proximity to the Assistant.

On-calendar (OC): indicates whether the user has a meeting with the owner that has either started or is about to start, e.g., based on a suitable time limit. The inference may leverage information from one or more face identification algorithms running on the captured video stream and the owner's calendar information.

As described above, the belief projection models make predictions about future beliefs at the perceptual level. The three perceptual inference models described above construct beliefs (i.e., probability distributions) over the corresponding binary percepts. The domain for the output of each perceptual model is the 1-dimensional simplex, i.e., the interval [0, 1] in this example. The belief projection models in turn model a belief (or probability distribution) over this domain. The belief projection models may be constructed in this case heuristically based on mixtures of Beta distributions, and/or they may be learned from data.

The action space for the mixed-initiative engagement policy includes two task actions: Engage, in which the Assistant engages the user immediately, and DontEngage, in which the Assistant decides to not engage the user at the current time-step. Utilities for the various combinations of state and action may be obtained from the assistant's owner; examples are shown in the Table below:

| State (S) | | System | |
|---|---|---|---|
| Engagement Action (EA) | Goal (G) | Engagement Action (A) | Utility |
| engaging | <any> | Engage | 1.00 |
|  |  | DontEngage | 0.05 |
| not-engaging | looking-for-owner | Engage | 0.75 |
|  |  | DontEngage | 0.25 |
|  | other | Engage | 0.10 |
|  |  | DontEngage | 1.00 |

The cost for taking a wait action may be elicited or estimated based on the current state (e.g., 0.05 in this example).

In addition, actions may be included to collect additional information: Wait(t) to collect additional sensory information and AskAndWait(t) to ask an external source and also collect sensory information while waiting for the response, where t ranges from 1 to 100 seconds, for example.

With the Wait(t) action the assistant 120 waits for a duration t, then takes the optimal action between Engage or DontEngage. The expected utility computation in this case takes into account (via the perceptual belief projection models) the likely impact of the sensory evidence to be accumulated by time t. In addition, the computation also takes into account the likelihood that the person might leave the scene. This probability is modeled based on the time since the actor was detected, e.g., via a mixture of two linear hazard rate distributions: the first component has a mean of around five seconds and models people that simply pass through the corridor, and the second component has a mean of around three-hundred seconds and models people that stay for a while in an area near the assistant 102.

With the AskAndWait(t) action, the assistant 102 launches an external query about the user's identity, waits for a duration t, then takes the optimal action between Engage and DontEngage based on the accumulated information. As with Wait(t), the computation takes into account the impact of future sensory evidence and the fact that the actor might leave by time t. In addition, in this case, the expected utility computation takes into account the probability that the response will arrive at some future time. The latter is modeled via a log-normal distribution with a mean time of some number of (e.g., forty) seconds.

At every time step, the assistant re-runs the decision algorithm and chooses the action with maximum expected utility, under the current uncertainty from sensor data. By taking this re-planning approach, the assistant 102 may choose a particular action such as Wait(10) at a certain time, and at the next time step the action selected may change (e.g., to something like Engage or Wait(50)) based on the accumulated evidence. Additionally, note that the actions are myopic with a short time horizon, and that the ability to re-plan with additional information is likely to improve the action decisions.

Figure 5A:
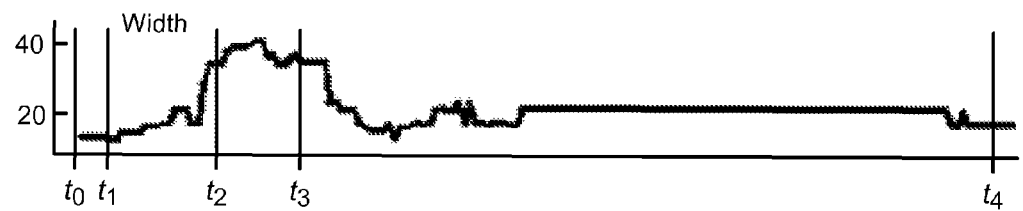
FIGS. 5A-5C are representations of example traces of sensed face width, action utilities, and inferences, respectively, according to one example embodiment.

Consider an example when a person (a possible visitor) approaches the office where the assistant 102 is stationed, passes by the assistant 102 and sits down in a nearby chair. The width of the detected face, which correlates with the distance between the person and the assistant 102, is determined, as represented in FIG. 5A. At a time $t_1$, as the person approaches, the assistant 102 reasons that future streaming sensory information is expected to clarify whether this person is the visitor expected for the current meeting on the owner's calendar, and therefore the highest utility action is Wait. The person in this example does not approach sufficiently, however, and does not enter in an f-formation with the system. By the time $t_2$ that he person sits in the chair, the assistant 102 still has uncertainty around his or her identity.

At this point the utility of launching an external information-gathering action may exceed the utility of waiting (FIG. 5B), such as once the perceptual belief projection model indicates that the identity will likely not be known better in the future, and the visitor is not likely to leave immediately. The assistant 102 may launch an external query about the user's identity. When the answer arrives, the maximum utility action may be Engage, whereby the system initiates a proactive engagement with the user "Hi, are you looking for [the owner]?"

The computations performed at different time steps include when the visitor is detected at and the assistant 102 starts using the decision theoretic engagement computations at time $t_1$, once the face identification algorithm provides a first estimate for the identity of the visitor. Between times $t_1$ and $t_2$, as the visitor is getting closer, the probability of f-formation and approaching are increasing; the assistant 102 is uncertain about whether this visitor is on-calendar (FIG. 5C). Based on the lower level perceptual evidence, the state inference indicates that at time $t_2$ the marginal probability that the visitor is looking-for-owner is 0.43 in this example of FIG. 5C. Throughout the $t_1$ to $t_2$ period, the expected utility for Engage has been steadily increasing and for DontEngage has been decreasing (FIG. 5B).

Figure 5B:
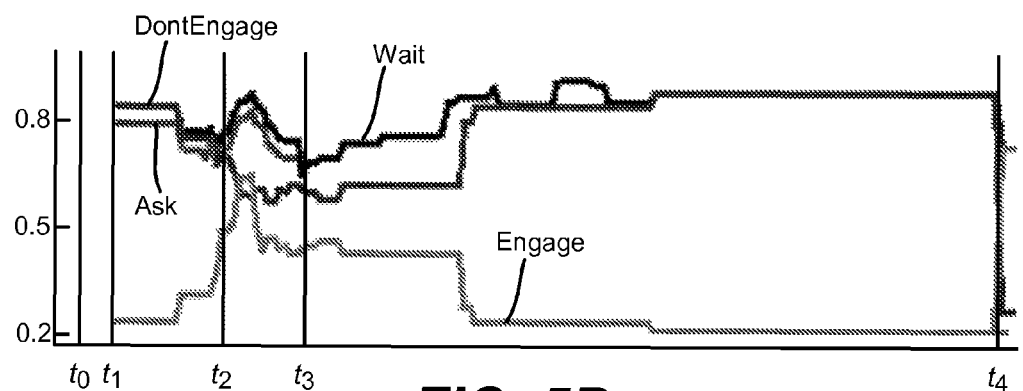
Figure 5C:
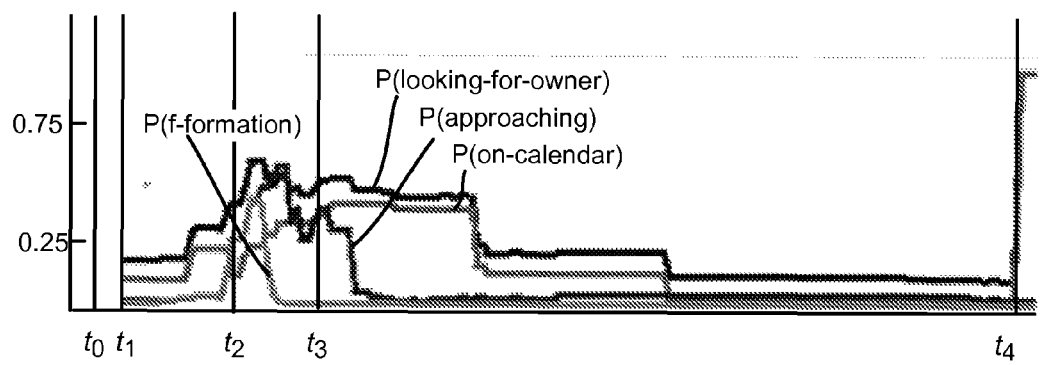
Figure 6A:
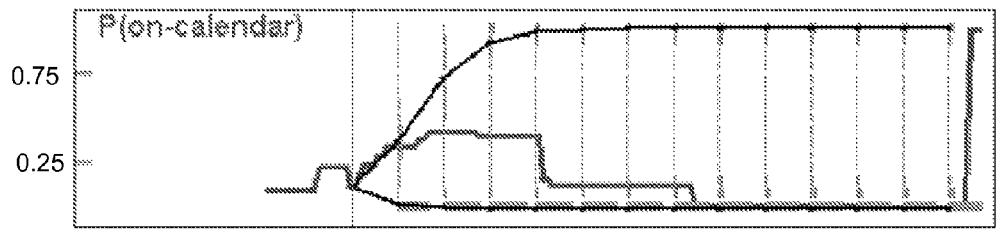
FIGS. 6A-6D are representations of projected percept beliefs over time, according to one example embodiment.
Figure 6B:
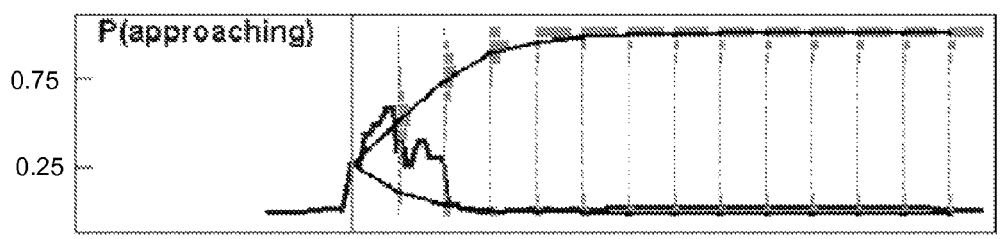
Figure 6C:
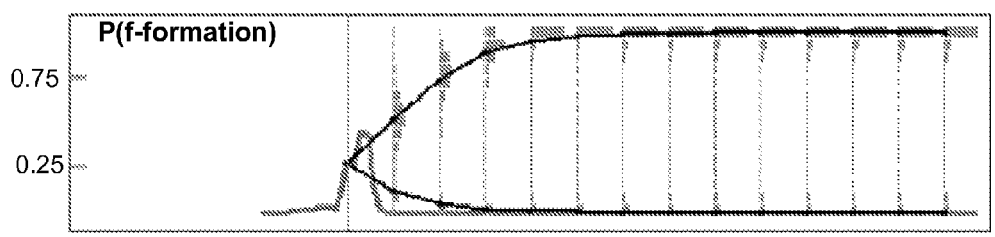

As also shown in FIG. 5B, the assistant 102 also computes the utility of Wait(t) and AskAndWait(t). For each time t, these computations are based on belief projection models for the On-calendar, Activity and F-formation percepts. As shown in FIGS. 6A-6C, the projected future beliefs may be represented by probabilities/histograms at every future time point for these three percepts, as computed at time $t_2$. In FIGS. 6A and 6B, the actual beliefs are shown as solid lines, and the projected beliefs shown as histograms.

The projected beliefs for the On-calendar percept (FIG. 6A) may be constructed as a mixture of two Beta distributions. The means of the two Beta distributions in the mixture are projected in time towards 0 and 1, with a slope based on how fast the actor is approaching the system. The resulting mixture model reflects the fact that, if the actor is getting closer the system, the On-calendar perceptual inference is more likely to output future beliefs concentrated towards 0 and 1. Note that mean of a projected belief has to match the current estimated probability that the person is on-calendar (since the On-calendar percept is invariant). The weights of the two components in the Beta mixture model are set such that this constraint holds.

Figure 6D:
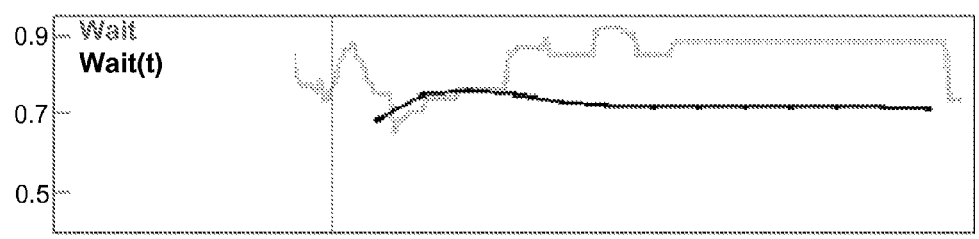

The projected beliefs for the Activity percept computed at time are shown in FIG. 6B. The same methodology of mixture of Betas with evolving means is used as for the On-calendar percept. One difference is that, because the Activity in not necessarily invariant, in this case the expected value of future beliefs does not need to match the current expectation. The future beliefs for the F-Formation percept are constructed in a similar manner, and shown in FIG. 6C. As FIGS. 6A-6C show, the future beliefs indicate that if the assistant 102 waits, the uncertainty will be reduced over whether the person is on the calendar, whether they are approaching, and whether they are engaging. The computation for the expected utility of Wait(t) integrates over these predicted future beliefs, and also takes into account the probability that the actor will disappear. FIG. 6D shows the resulting expected utility of Wait(t) for different values of t. The maximum expected utility is attained for a wait time of t equals three seconds, and corresponds to the value for the Wait action shown in gray in FIG. 6D. Similarly, the computation for the expected utility of AskAndWait(t) integrates over the predicted future beliefs, over the probability that the response might arrive by time t, and takes into account the likelihood of different responses.

As FIG. 5B shows, while the expected utility on Engage increases between $t_0$ and $t_2$, and even exceeds the expected utility of DontEngage shortly thereafter, the expected utility of Wait is even larger: the system infers that waiting is most beneficial because the person is getting closer and uncertainties about their identity, and ultimately their goals will likely be resolved in the near future.

Figure 7A:
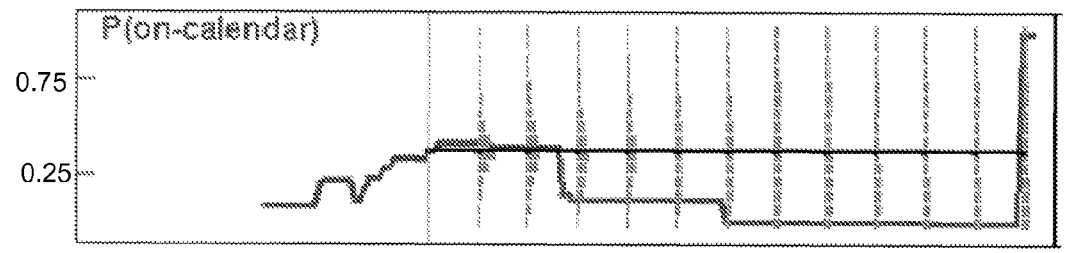
FIGS. 7A-7C are representations of projected percept beliefs over time and distribution data, according to one example embodiment.
Figure 7B:
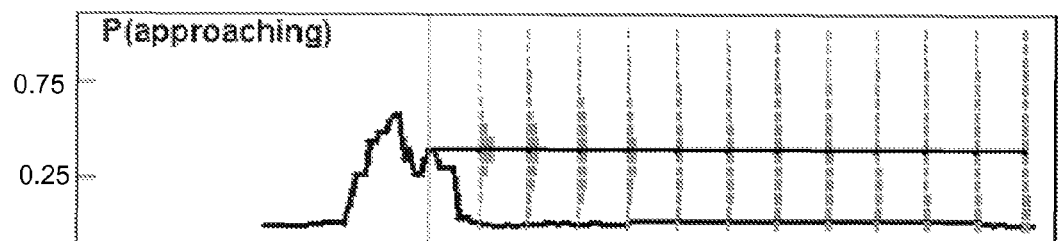
Figure 7C:
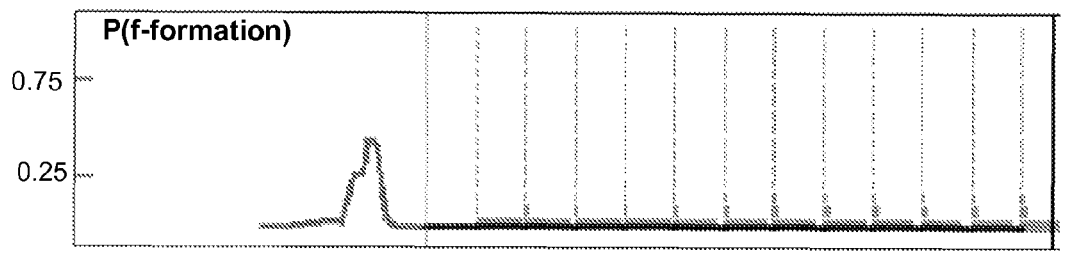

Next, in this example, the visitor passes by the assistant 102 and sits in a nearby chair. In FIGS. 7A-7C the projected beliefs for the On-calendar, Activity and F-Formation percepts, are again shown, as computed at time $t_3$. As the person is no longer getting closer (the gradient on the face size is no longer positive as shown in FIG. 5A), the projected beliefs indicate that there is not much to gain from waiting. At this point, $t_3$, the expected utility of AskAndWait exceeds the expected utility of Wait (FIG. 5B), and the Assistant launches an external query about the identity of the visitor. From this point forward the AskAndWait action is no longer evaluated, but the expected utility computation for the Wait action also takes into account the fact that the response to the system's information gathering action might arrive.

A few seconds later in this example, at time $t_4$, the answer arrives, namely that the visitor is indeed the person the owner is expecting, whereby the corresponding probability for on-calendar increases to 1.0 (see FIG. 5C), and the maximum expected utility action becomes Engage (see FIG. 5B). The assistant 102 initiates an engagement with the visitor that is at this point still waiting in the chair by saying "Pardon me, are you looking for [the owner]?"

Figure 8:
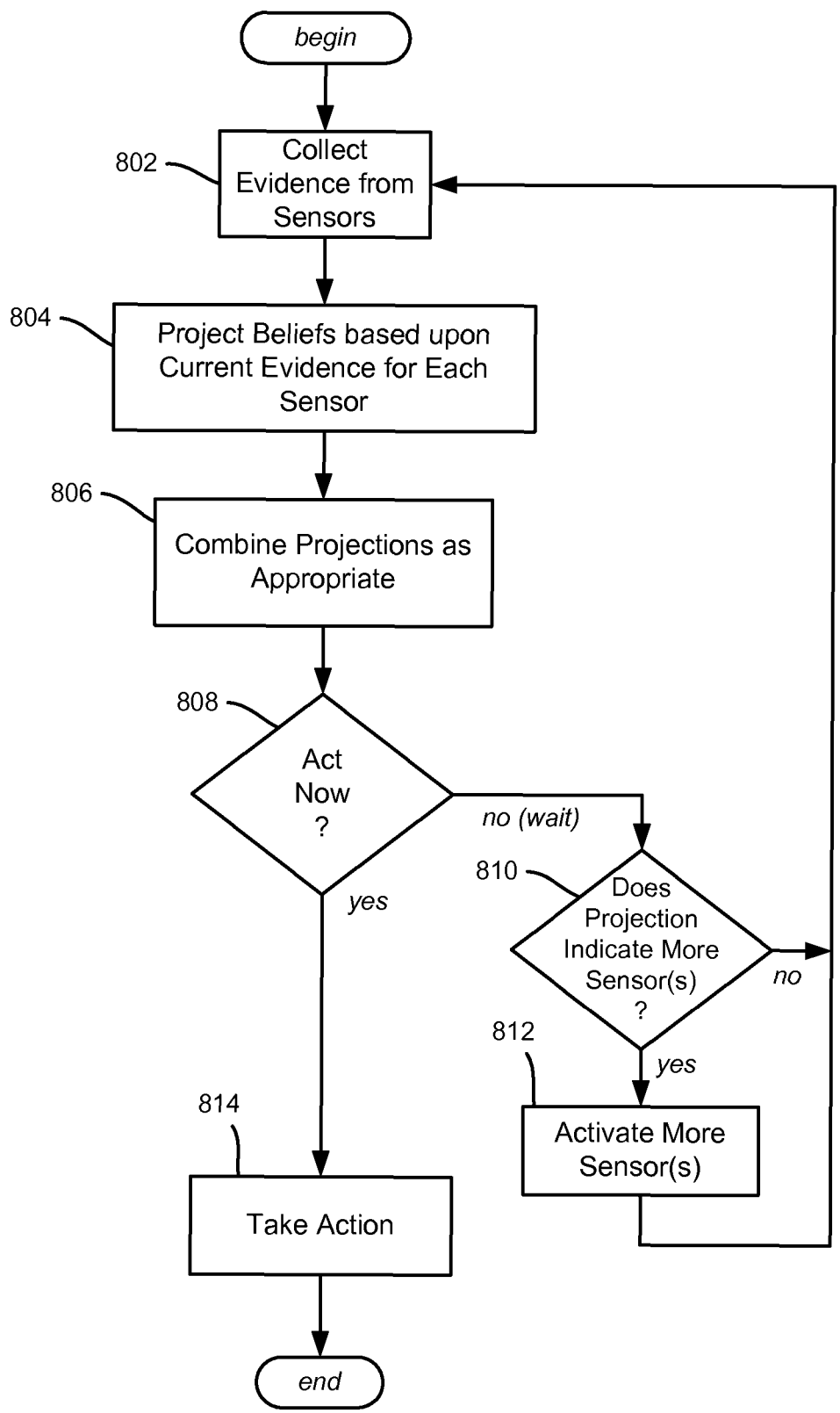
FIG. 8 is a flow diagram showing example steps that may be taken to process sensory evidence into an action determination, according to one example embodiment.
Figure 9:
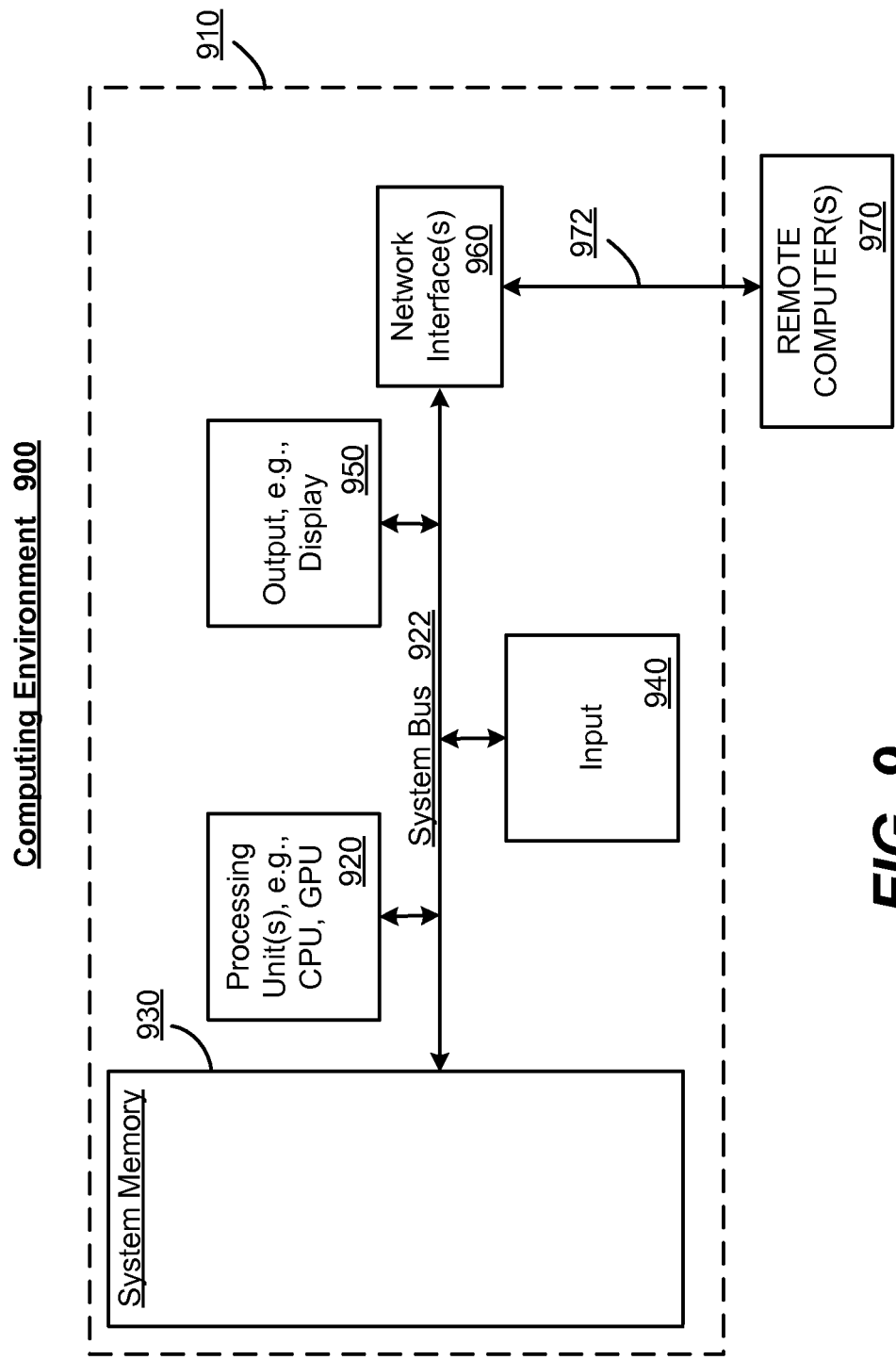
FIG. 9 is a block diagram representing an example computing environment, into which aspects of the subject matter described herein may be incorporated.

FIG. 8 summarizes some of the concepts described herein via a flow diagram comprising example steps. In FIG. 8, step 802 represents collecting the evidence. Step 804 represents using the current evidence to project future beliefs, using the models as described herein. Step 806 represents combining the projections as appropriate, e.g., from the perceptual projection models in use.

Based upon the future belief, step 808 represents a determination as to whether to act now or wait for more evidence. If the decision is to wait, step 808 branches to step 810.

Step 810 represents determining whether to use/activate one or more sensors; (one or more other sensors may be turned off, e.g., if their information is no longer needed or relevant, or cannot change over time). If so, step 812 represents activating the one or more sensors. Note that as used herein, asking a crowd/expert for assistance is considered activating another sensor at step 812.

Step 814 represents taking the action, which may be to do something active, or end the process. For example, in the assistant scenario described above, the action may be a decision to engage, in which audio and/or visible data (and possibly other data such as haptic feedback) is output to the user. Conversely, the decision may be to not engage, in which event the process may end until triggered again, or, for example adjust to give attention to a different user who is approaching.

As can be seen, described herein is a technology that addresses various challenges of computing the value of information in systems that operate with high-dimensional streaming sensory evidence. The technology is based upon developing belief projection models, comprising direct conditional models that can be trained from data to predict future beliefs from existing evidence. The technology may leverage such models to resolve tradeoffs between acting immediately versus waiting for more sensory evidence to accumulate. The technology is conducive for computing value of information in systems that use modular, hierarchical architectures for making state inferences.

The technology may be implemented in a deployed physically situated interactive agent with a mixed-initiative engagement policy. The system is able to resolve tradeoffs between waiting for more information to accumulate from the face identification sensor, soliciting help in real time from a local group of experts to identify a person, and/or acting immediately (proactively engaging the person) based on the existing face identification data.

Example Operating Environment

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 5 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

FIG. 5 thus illustrates an example of a suitable computing system environment 500 in which one or aspects of the embodiments described herein can be implemented, although as made clear above, the computing system environment 500 is only one example of a suitable computing environment and is not intended to suggest any limitation as to scope of use or functionality. In addition, the computing system environment 500 is not intended to be interpreted as having any dependency relating to any one or combination of components illustrated in the example computing system environment 500.

With reference to FIG. 5, an example remote device for implementing one or more embodiments includes a general purpose computing device in the form of a computer 510. Components of computer 510 may include, but are not limited to, a processing unit 520, a system memory 530, and a system bus 522 that couples various system components including the system memory to the processing unit 520.

Computer 510 typically includes a variety of computer readable media and can be any available media that can be accessed by computer 510. The system memory 530 may include computer storage media in the form of volatile and/or nonvolatile memory such as read only memory (ROM) and/or random access memory (RAM). By way of example, and not limitation, system memory 530 may also include an operating system, application programs, other program modules, and program data.

A user can enter commands and information into the computer 510 through input devices 540. A monitor or other type of display device is also connected to the system bus 522 via an interface, such as output interface 550. In addition to a monitor, computers can also include other peripheral output devices such as speakers and a printer, which may be connected through output interface 550.

The computer 510 may operate in a networked or distributed environment using logical connections to one or more other remote computers, such as remote computer 570. The remote computer 570 may be a personal computer, a server, a router, a network PC, a peer device or other common network node, or any other remote media consumption or transmission device, and may include any or all of the elements described above relative to the computer 510. The logical connections depicted in FIG. 5 include a network 572, such local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A method for executing an assistant on a computing device to determine whether or not to act, the method comprising:
    receiving, by the assistant, streaming evidence from one or more sensors;
    constructing, by the assistant, one or more belief projection models to predict a future belief over a state at a future time, the one or more belief projection models using existing evidence that is collected until a defined period of time to determine a probability of a future state that is based on evidence to be collected between the defined period of time and the future time, the existing evidence comprising the streaming evidence and other evidence obtained prior to the streaming evidence;
    based on the predicted future belief and the one or more belief projection models, determining, by the assistant device, a likelihood of obtaining particular evidence between the defined period of time and the future time to determine whether to act at the defined period of time for a next action or wait for the future time to act for the next action; and
    based on determining to act at the defined period of time or wait for the future time to act for the next action, transmitting, by the assistant device, data using an output device at the defined period of time without obtaining the particular evidence or upon receipt of the particular evidence at the future time.

2. The method of claim of claim 1 wherein determining the timing of the next action comprises computing a cost of taking the next action at the future time.

3. The method of claim 1 wherein constructing the one or more belief inference projection models comprises processing at least part of the existing evidence into percepts.

4. The method of claim 1 wherein constructing the one or more belief inference projection models comprises projecting models for at least one of: on-calendar, activity or F-formation related percepts.

5. The method of claim of claim 1 further comprising based on a determination to act without obtaining the particular evidence, initiating engagement with a person by using the output device.

6. The method of claim 1 further comprising associating a cost with activating the at least one other sensor.

7. The method of claim 1 wherein activating the at least one other sensor comprises seeking a response from one or more humans.

8. The method of claim of claim 1 further comprising one or more of the following: a) learning the belief projection model automatically from data via one or more parametric machine learning approaches, b) learning the belief projection model automatically from data via non-parametric machine learning approaches, and c) constructing the belief projection model manually via a set of heuristic rules.

9. The method of claim of claim 1 further comprising automatically collecting training data while receiving the streaming evidence.

10. A system for executing an assistant on a computing device to determine whether or not to act, the system comprising:
    a processor;
    processing logic;
    a sensor set comprising one or more sensors; and
    an output mechanism set comprising one or more output devices;
    the processing logic, when executed by the processor, configured to:
        process evidence received via the sensor set, including streaming the evidence into one or more belief projection models, the one or more belief projection models using existing evidence that is collected until a defined period of time to determine a probability of a future state that is based on evidence to be collected between the defined period of time and the future time, the existing evidence comprising the streaming evidence and other evidence obtained prior to the streaming evidence;
        using a predicted future belief obtained from the one or more belief projection models to determine a likelihood of obtaining particular evidence between the defined period of time and the future time to determine whether to act at the defined period of time for a next action or wait for the future time to act for the next action; and
        based on determining to act at the defined period of time or wait for the future time to act for the next action, transmitting data using one or more of the output devices at the defined period of time without obtaining the particular evidence or upon receipt of the particular evidence at the future time.

11. The system of claim 10 wherein the processing logic is incorporated into an autonomous assistant that uses the predicted future belief over the state to determine whether to initiate engagement with a person.

12. The system of claim 10 wherein the sensor set comprises a camera, and wherein the processing logic processes streaming evidence received via the camera.

13. The system of claim 10 wherein the sensor set comprises a connection to computing devices that interface with humans that respond with at least some of the particular evidence.

14. The system of claim 10 wherein the output mechanism set comprises a speaker.

15. The system of claim 14 wherein the audio data comprises speech, including speech to initiate engagement with a person.

16. One or more computer-readable hardware storage devices having computer-executable instructions for executing an assistant on a computing device to determine whether or not to act, that cause the assistant to perform operations comprising:

receiving sensory evidence, including high-dimensional streaming evidence into one or more belief projection models, the one or more belief projection models using existing evidence that is collected until a defined period of time to determine a probability of a future state that is based on evidence to be collected between the defined period of time and the future time, the existing evidence comprising the streaming evidence and other evidence obtained prior to the streaming evidence;

determining a likelihood of obtaining particular evidence is between the defined period of time and the future time to determine whether to act at the defined period of time for a next action or wait for the future time to act for the next action;

based on determining to act at the defined period of time or wait for the future time to act for the next action, transmitting data using an output device at the defined period of time without obtaining the particular evidence or upon receipt of the particular evidence at the future time.

17. The one or more computer-readable hardware storage devices of claim 16 having further computer-executable instructions that cause the computing device to perform an operation comprising making a decision to wait for the particular evidence to be received.

18. The one or more computer-readable hardware storage devices of claim 16 having further computer-executable instructions that cause computing device to perform an operation comprising making a decision to act without waiting for the particular evidence.

19. The one or more computer-readable hardware storage devices of claim 16 having further computer-executable instructions that cause the computing device to, based on a determination to act without obtaining the particular evidence, initiating engagement with an electronic assistant using the output device.

20. The one or more computer-readable hardware storage devices of claim 16, wherein constructing the one or more belief inference projection models comprises processing at least part of the existing evidence into percepts.

* * * * *